Figure 6:
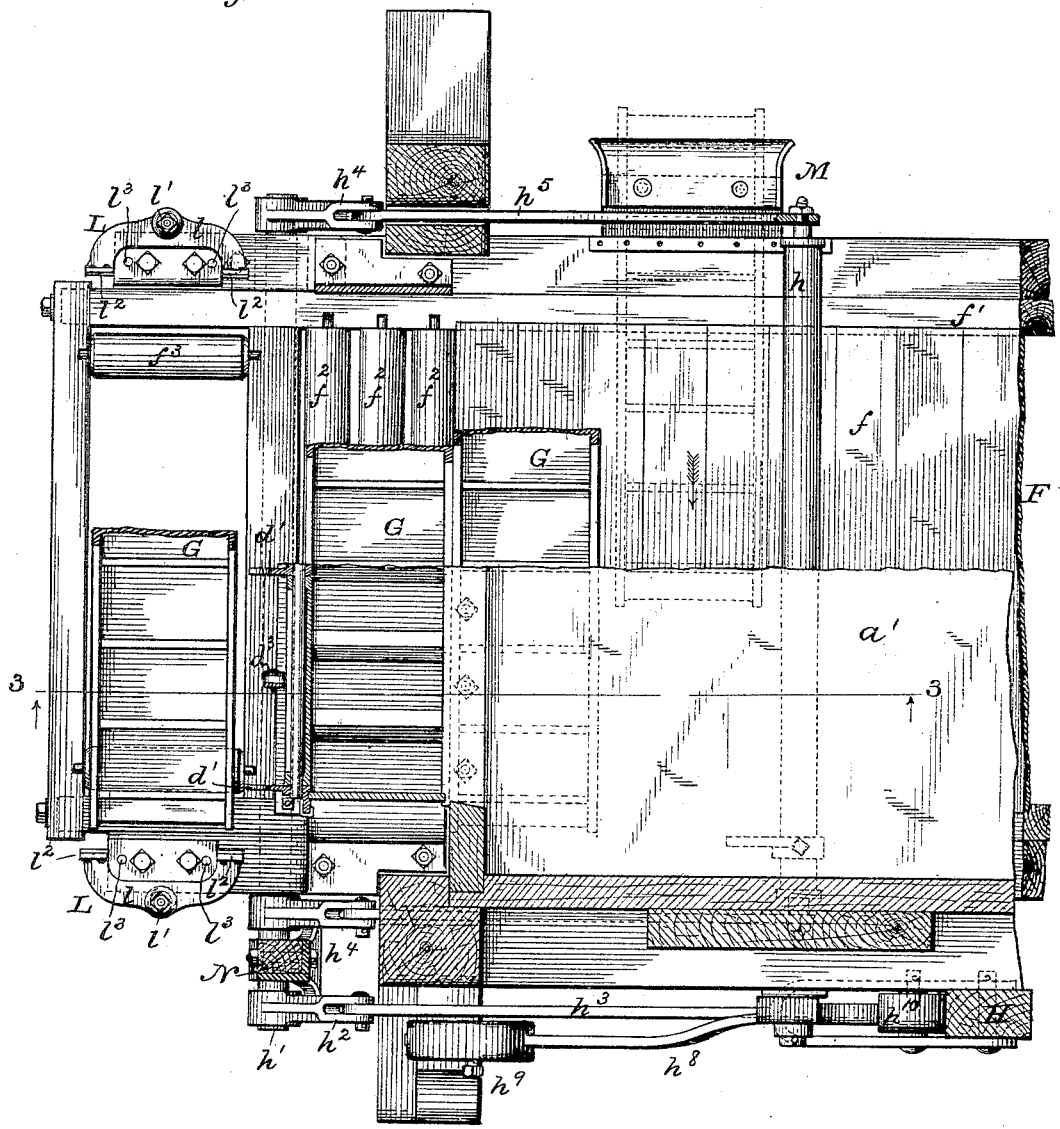

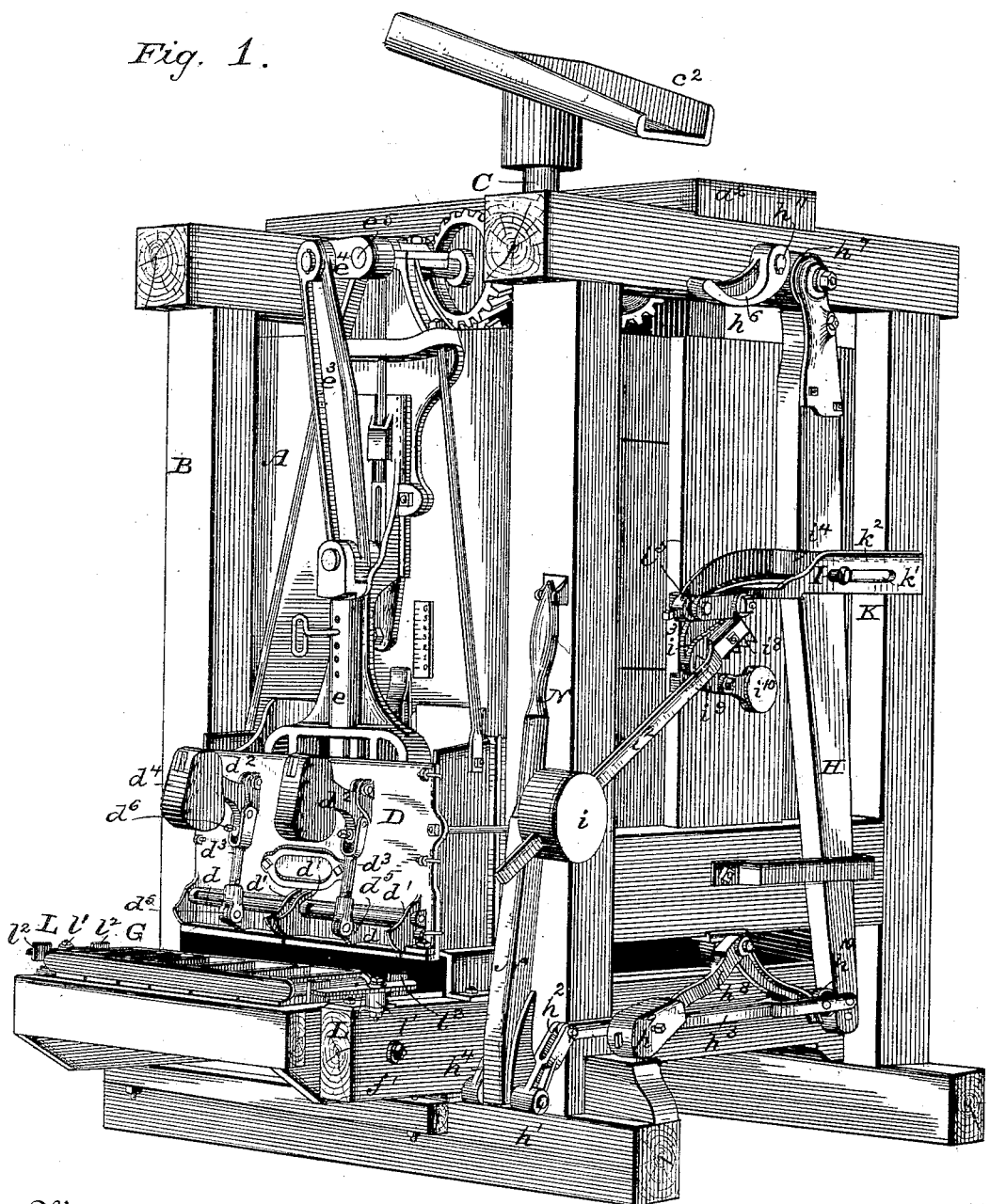

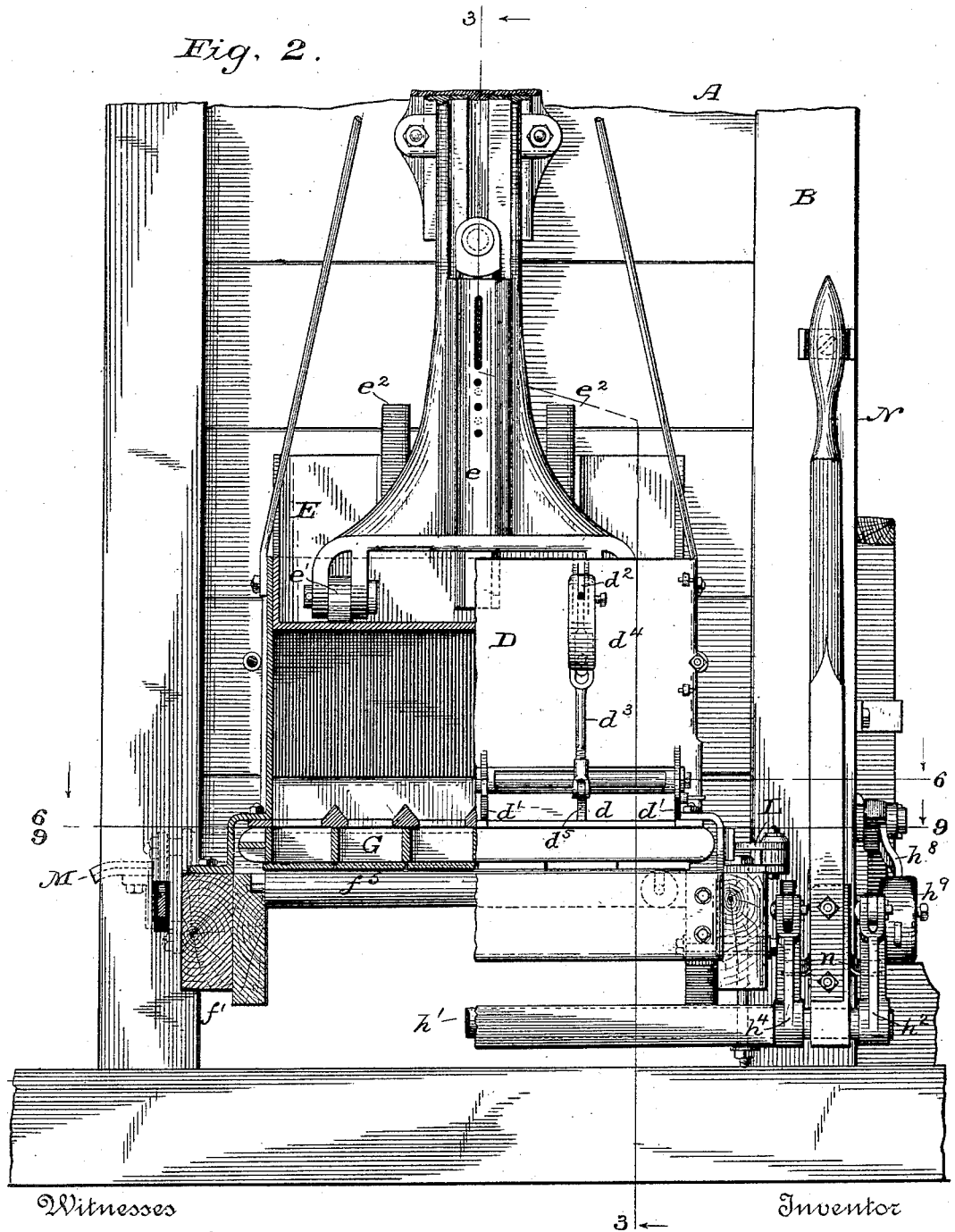

(No Model.)
W. H. HALL.
BRICK MACHINE.
No. 442,181. Patented Dec. 9, 1890.
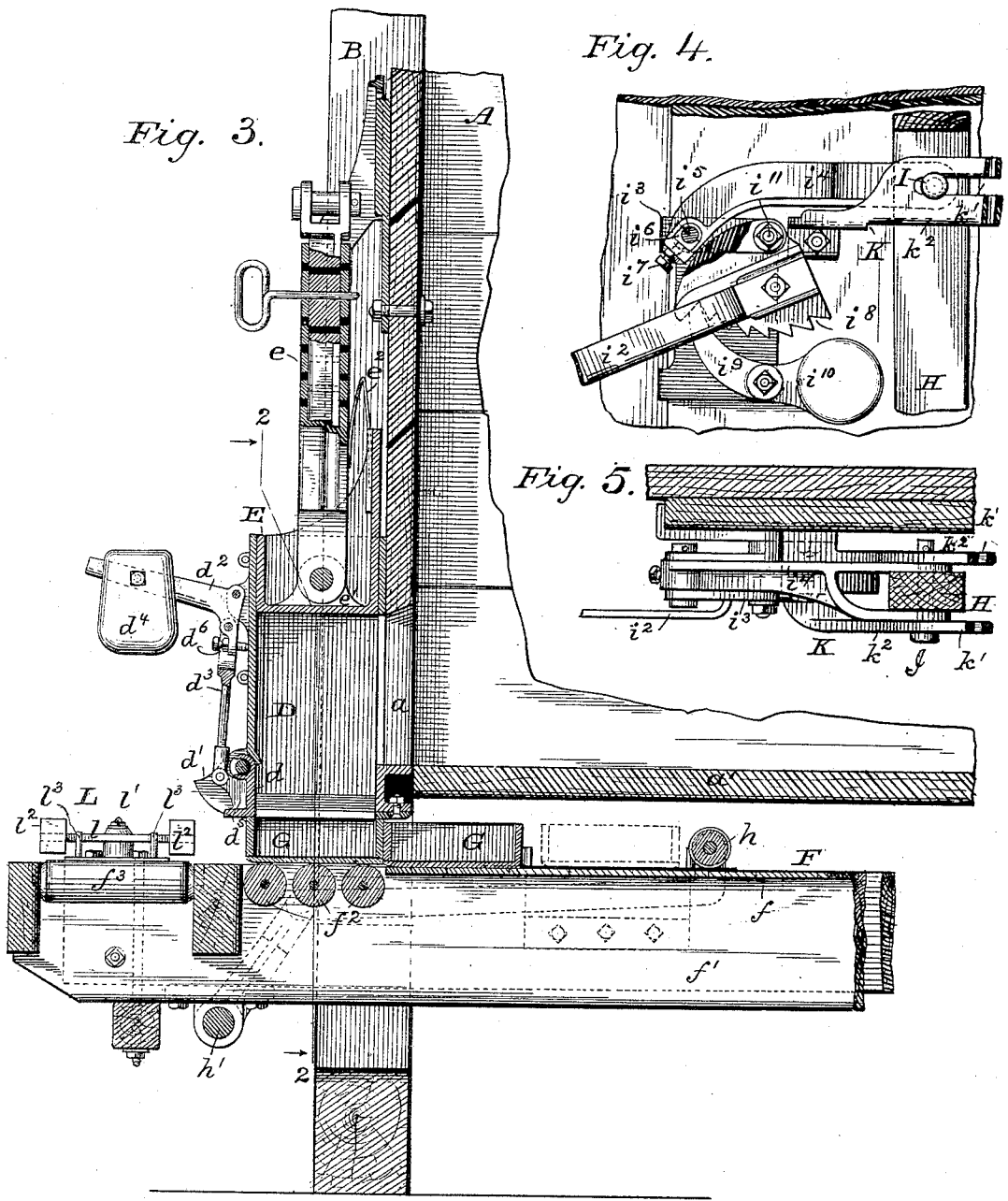
Witnesses
Wm A. Skinkle
Arthur Johnson.
Inventor
William H. Hall
By his Attorneys
Parkinson & Parkinson (No Model.) W. H. HALL. 6 Sheets—Sheet 4.
BRICK MACHINE.

No. 442,181. Patented Dec. 9, 1890.

Witnesses
Wm A. Sinkle
Arthur Johnson.

Inventor
William H. Hall
By his Attorneys
Parkinson & Parkinson (No Model.)  6 Sheets—Sheet 5.
W. H. HALL.
BRICK MACHINE.
No. 442,181.  Patented Dec. 9, 1890.
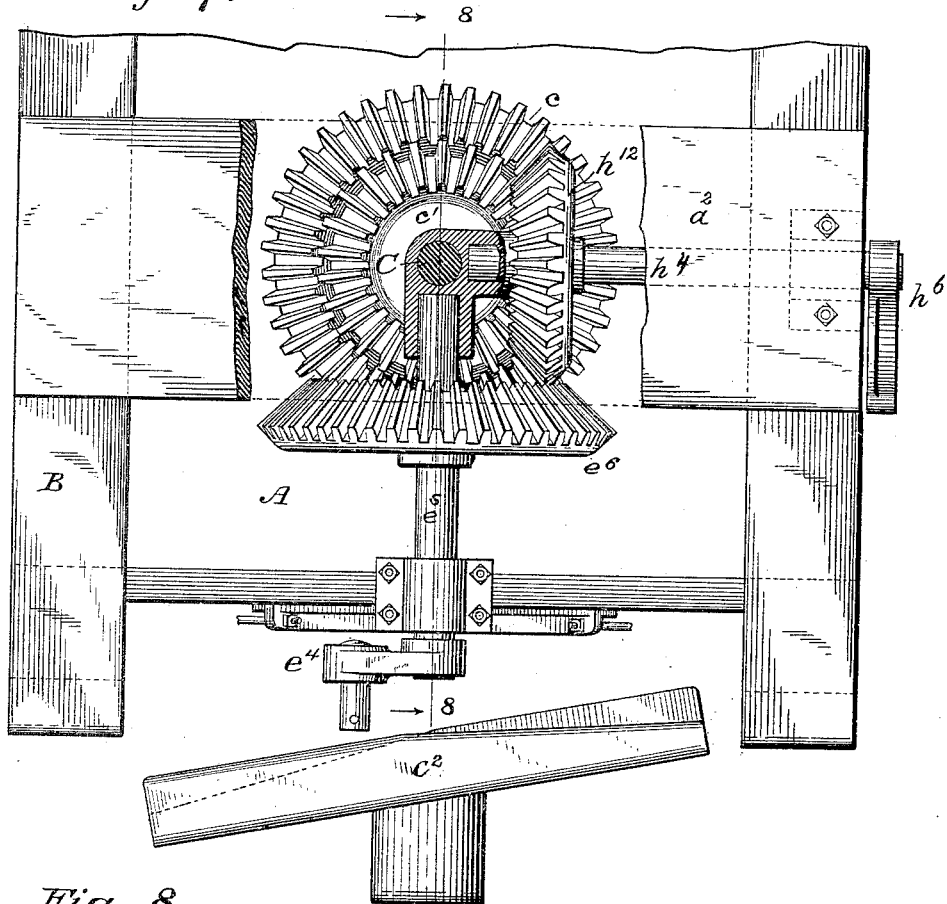
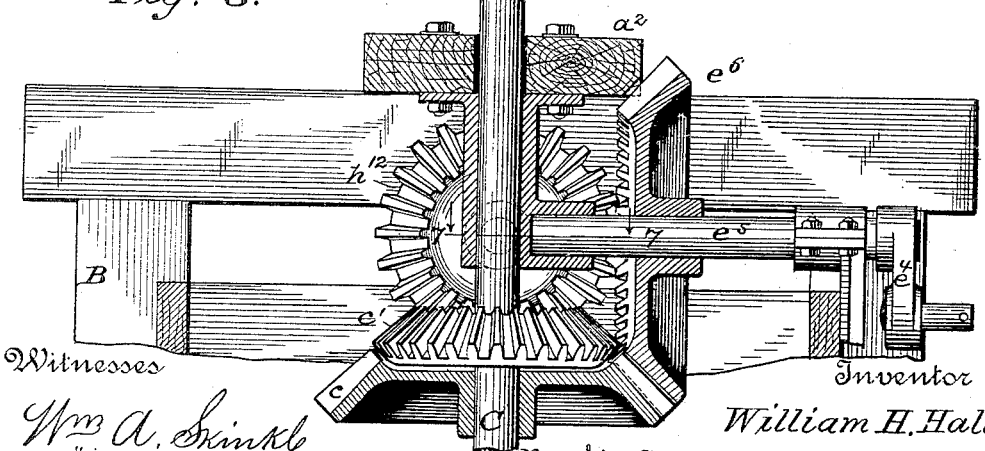
Witnesses
Wm. A. Skinkle
Arthur Johnson.
Inventor
William H. Hall
By his Attorneys
Parkinson & Parkinson (No Model.) 6 Sheets—Sheet 6.
W. H. HALL.
BRICK MACHINE.
No. 442,181. Patented Dec. 9, 1890.
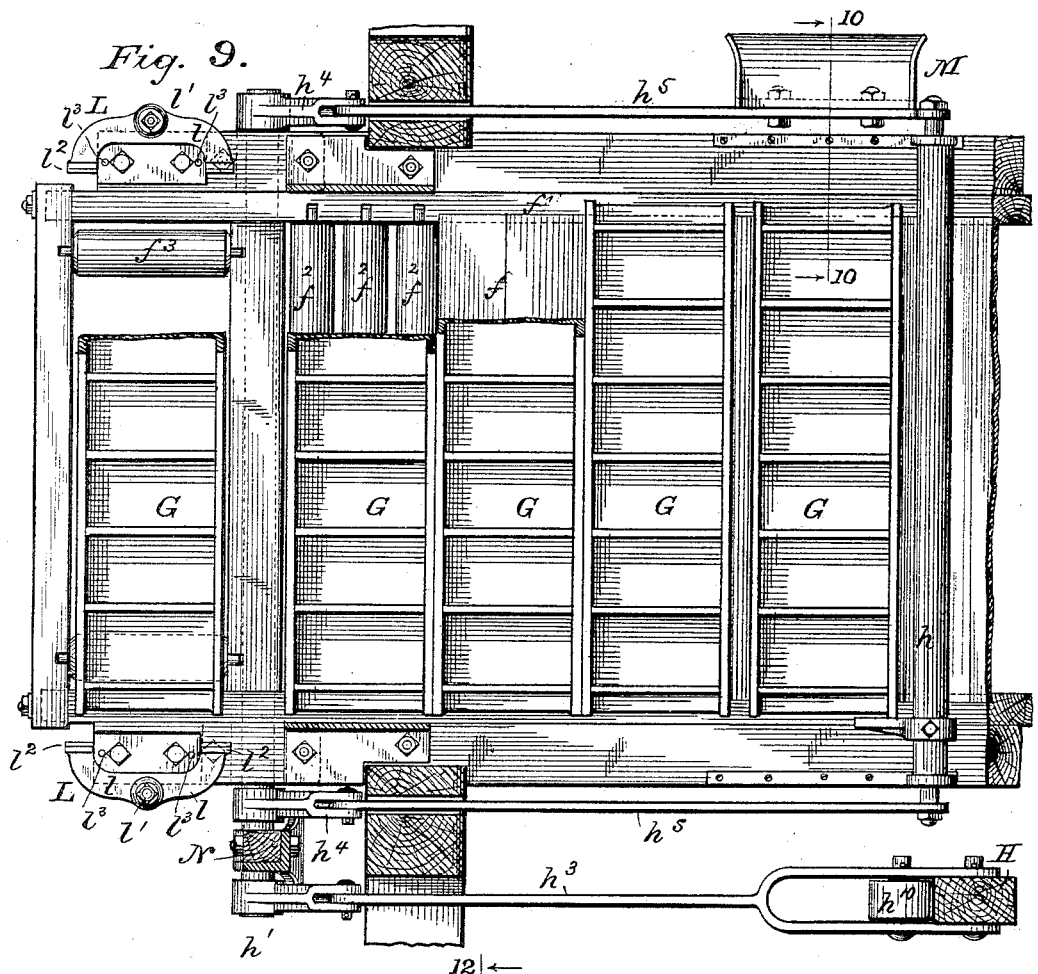
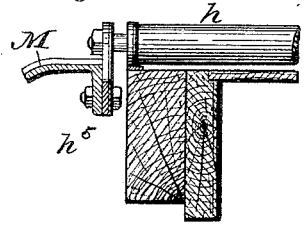
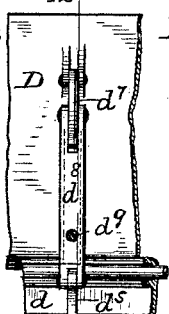
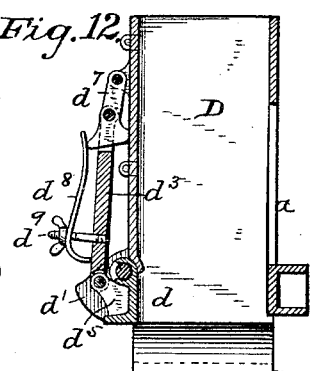
Witnesses
Wm A. Skinkle
Arthur Johnson.
Inventor
William H. Hall
By his Attorneys
Parmusen & Parkinson

UNITED STATES PATENT OFFICE.

WILLIAM H. HALL, OF TIFFIN, OHIO.

BRICK-MACHINE.

SPECIFICATION forming part of Letters Patent No. 442,181, dated December 9, 1890.

Application filed September 15, 1888. Serial No. 285,543. (No model.)

*To all whom it may concern:*

Be it known that I, WILLIAM H. HALL, a citizen of the United States of America, residing at Tiffin, in the county of Seneca and State of Ohio, have invented certain new and useful Improvements in Brick-Machines, of which the following is a specification.

My invention relates to automatic brick-machines of that kind wherein the clay is tempered in a suitable pug-mill and subsequently pressed into molds by means of a reciprocating plunger arranged to drive the tempered clay from an open-bottom press-box, which is in free communication with the interior of the pug-mill, so as to receive the tempered clay therefrom and so arranged relatively to the accessory mechanism that a set of molds may be brought into position below the open bottom of the press-box to receive the clay that is driven therefrom by the plunger.

Certain prominent objects of my invention are, first, to advance the molds with a uniform motion; second, to facilitate such motion on the part of the molds and to render the device for effecting such movement easy of operation; third, to provide an automatic safety device whereby in the event of any obstruction being placed in the way of either the advancement of the molds or the free action of the device for thus advancing the molds such safety device shall be called into action in a way to interpose between the mold and the source of driving-power a yielding resistance which will yield to the power to an extent to prevent breakage of or injury to the mold-advancing devices; fourth, to provide improved means for automatically returning the mold-pusher after the latter has completed its forward stroke; fifth, to permit the molds to be readily passed from under the press-box, notwithstanding the presence of any foreign matter that may lodge upon the molds; sixth, to provide one or more self-adjusting bumpers, whereby the mold-frame may at all times be brought squarely against the bumper, and hence avoid racking the frame; seventh, to provide safe and simple means for advancing a mold by manual labor, when so desired; eighth, to steady and accurately guide the plunger and to insure a close sliding joint or connection between the plunger and the walls of its allotted guideway; ninth, to facilitate the positioning of empty molds in advance of the pusher by which they are carried into place for filling; tenth, to so time the machine that but one mold will be filled to each revolution of the pug-shaft, and, finally, to provide certain improved details, all serving to promote the general efficiency of an automatic brick-machine.

In the drawings, Figure 1 represents in perspective an automatic brick-machine embodying the principles of my invention. Fig. 2 represents the same in front elevation with certain portions of the machine broken away for convenience of illustration. Fig. 3 is a vertical section taken through the front portion of the machine on the correspondingly-numbered line in the second and sixth figures. Fig. 4 represents in side elevation the automatic safety device with certain parts broken away. Fig. 5 is a top plan view of the parts represented in Fig. 4, certain parts being in horizontal section. Fig. 6 is a sectional plan on the correspondingly-numbered line in Fig. 2, a portion of the bottom of the pugging tub or vat being broken away, as are also portions of certain of the mold-frames. Fig. 7 is a top plan view of the pug-mill proper with a portion of the bridge broken away so as to expose the gearing. In said view a section is taken through the pugging-shaft at a point where bearings are provided for the inner ends of certain counter-shafts. Fig. 8 represents a vertical section on the correspondingly-numbered line in the preceding figure. Fig. 9 is a sectional plan on line 9 9 of the second figure. Fig. 10 is a detail representing a section on line 10 10 of the preceding figure. Fig. 11 represents in front elevation a spring attachment for closing a door at the lower portion of the press-box, and Fig. 12 is a section on line 12 12 of the eleventh figure.

The tub or vat A, with exit or discharge orifice $a$ through one of its walls adjacent to the bottom $a'$ and constituting the pugging tub or vat of the mill, and the bridge $a^2$, crowning its open top, are herein shown as arranged within and upon and braced and supported by the heavily-timbered frame B, which rests upon or rises from suitable base-sills. The tub will of course contain suitable devices for working the clay and for forcing it as it becomes properly tempered out through the discharge-orifice and into the press-box. These devices may be such as are commonly employed in pug-mills—as, for example, a set of knives arranged upon a rotary shaft and adapted for appropriately working the clay and a mud wing or ejector also secured upon the shaft near its foot and arranged with suitable reference to the position of the discharge-orifice through which it is to force the clay that has been worked by the knives.

A portion of a rotary power-driven shaft C, adapted to carry the knives and mud-wing, and hereinafter termed the "pug-shaft," vertically stepped through the center of the pugging-vat and having its upper bearing in the before-mentioned bridge, is herein illustrated, particular representations of the said devices for working and ejecting the clay being regarded as unnecessary, since such matters are common and well understood by those acquainted with the art. This pug-shaft is shown in Figs. 7 and 8 as carrying a double bevel-gear, which in effect comprises a comparatively larger outer gear $c$ and a smaller inner gear or pinion $c'$, the former being intended to transmit power to the plunger and the latter to the push-bar, as hereinafter explained.

The pug-shaft can be driven from any desired source of power; and if, for example, driven from an engine or suitable motor, it will be evident that the bevel-gear $c$ can be arranged on the under side of a master-wheel fixed upon the pug-shaft at a point above the bridge that extends across the top of the main frame. In place, however, of such operating device, the pug-shaft can be provided with a sweep-holder $c^2$ for a sweep, whereby it may be readily driven by horse-power.

At the exit or discharge side of the tub is arranged a press-box D, having at its back an opening in register with the discharge-orifice thereof, whereby the tempered clay when forced from the tub enters directly into the box, and from this is packed through the open bottom thereof into the molds which pass therebeneath.

In brick-molding presses where the mold is arranged to pass closely to the under side of a press-box it frequently happens that foreign matters which have entered the box and lodged upon the molds project up from the molds and become so caught that the mold connot pass under the lower edge of the front side of said box. As a result of such obstruction, it has heretofore been found necessary to stop the machine until the obstructing matter has been removed. As a means for obviating such defects, I form the lower portion of the front plate or front side of the press-box of one or more doors $d$, which are hung from one or more overhead horizontal pivots. In this way where any obstructing foreign matter lodges upon the filled mold the door or doors will yield to such foreign matter when the mold is pushed from under the press-box, and by thus automatically opening will permit the mold, with the foreign matter thereon, to pass freely out. Where a single door is provided for the aforesaid purpose, I prefer arranging at each end thereof a suitable guard, so that when the door is swung open the spaces between its ends and the front side of the press-box may be closed by such guards, thus preventing the escape of clay at such points. Where two or more doors are provided, the guards can be multiplied so far as may be necessary. Thus, where two doors are employed, as herein illustrated, four of such guards $d'$ will answer the purpose, or, if desired, but three guards may be used, since in such case the middle guard can be used for the opposing ends of two doors. These guards $b'$ are formed by plates or flanges either integral with or secured to the front side of the press-box, it being observed that while a single door could have at each end one of such guards arranged to extend back from the door it is preferable to arrange the guards upon the press-box.

While various spring or weighted contrivances might be employed for holding the doors closed during all ordinary work, I have herein illustrated two simple and efficient devices for controlling the doors, one of said devices being dependent for its action upon a weight, while the other is dependent upon a spring. The device involving the use of a weight comprises a weighted bell-crank lever $d^2$, that is pivoted upon the front side of the press-box and connected with the door by an adjustable link or connecting-rod $d^3$. The forwardly-projecting long arm of the bell-crank lever carries an adjustable weight $d^4$, and the short pendent arm of said lever is pivoted to the link or connecting-rod, which latter is in turn conveniently attached at its lower end by a hinge or pivot to a lug $d^5$ upon the door. When the door is closed, the fulcrum of the bell-crank lever and the pivots or joints by which the link is respectively connected with said lever and with the door are all three nearly in line, so as to nearly attain the lock possible to a toggle-joint. By this arrangement the weight upon the long arm of the bell-crank will serve to hold the door closed during all ordinary work; but upon the occasion of undue pressure being brought against the inner side of the door the latter will open against the resistance of the weight, which will be raised through the medium of its connection with said door. The short pendent arm of the bell-crank lever carries an adjusting-screw $d^6$, which bears against the front side of the press-box, as in Fig. 3, and serves as an adjustable stop or contact-point, which can be set to vary the normal elevation of the weight, and also determine the normal position of the pivot at the upper end of the link or connecting-rod relatively to a right line between the pivot at its lower end and the pivotal center about which the lever is arranged to swing.

In Figs. 11 and 12 I have represented a spring attachment for closing the door. In said attachment the connecting rod or link $d^3$ is at its lower end hinged to the lug $d^5$, as before, and at its upper end is pivotally attached to a lever $d^7$, which depends from a pivot upon a lug or bearing from the press-box, and in place of an adjustable stop the lower end of said lever can be enlarged or bent in any suitable way, so as to cause it to normally stand out from the press-box to a proper extent. The link is in this instance pivotally attached to the lever at a point intermediate of the ends of the latter, and a spring $d^8$ is secured to the link and arranged to bear against the lower end of the lever. By this arrangement the door will, when opened, be swung against the resistance of the spring, which can be adjusted by any ordinary set-screw, or by a thumb-nut $d^9$ upon a screw attached to the link.

In either of the devices hereinbefore described for closing the door the connection between the lever and the door obviates the necessity for either a heavy weight or a very strong spring, for the reason that when the door is closed the several pivots of the attachment are nearly in one and the same line.

A vertically-reciprocating plunger, preferably formed hollow or as a shell, open at top, works in the press-box to force the clay through the open bottom and press it into such molds as may have been brought into position. This plunger is suspended from an extensible or other suitable plunger rod or stem $e$, which is advisably widened at its lower end and pivotally attached to lugs $e'$, which rise from the bottom of the plunger. By providing the foregoing or other suitable hinge-connection between the plunger-stem and the bottom plate of a hollow or box-like plunger the plunger will line itself to its allotted guideway in the press-box, and hence will work true and permit of accurate fitting to the interior of the box. As a further means for insuring a close sliding joint between the plunger and the front and rear inner walls of the press-box, a spring $e^2$ is arranged between the plunger-stem and the back wall of the box, as in Fig. 3, so that any tendency on the part of the plunger to wabble or tilt will be counteracted by the presence of said spring. The plunger is herein operated through the medium of a pitman $e^3$, arranged to connect the plunger-stem with a crank $e^4$ upon a horizontally-arranged transmission-shaft $e^5$, that is gear-connected with the pug-shaft—to wit, by means of the bevel-gears $e^6$ upon said transmission-shaft meshing with the outer or larger of the bevel-gears on said pug-shaft.

Below the plane of the bottom of the pugging-vat is a long table or platform F for supporting the molds. This table extends under both the press-box and the closed bottom of the pugging-tub, and is also extended forwardly from the press-box. The portion of the platform that is below the bottom or floor of the pugging-tub serves as a receiving-table, upon which any desired number of empty sets of molds can be placed preparatory to bringing them under the press-box. The part of the platform underneath the press-box affords a substantial bed whereon a set of molds may be supported in position to receive the clay, while the portion of the platform that extends forwardly from the press-box serves as a mold-table arranged in convenient position for receiving the filled molds from the bed or press-table. The outer section of the platform or table designed to receive the empty molds is herein formed by simply boarding over or otherwise providing a suitable flooring $f$ upon a frame $f'$, while the bed or table under the press-box is preferably provided by a series of rolls $f^2$, journaled in said frame and arranged transversely to the direction in which the molds are advanced from the rearwardly-arranged receiving-table to the mold-table at the front of the machine. This latter is preferably formed by a set of short rolls $f^3$, that are mounted in the above-mentioned floor-frame or an extension thereof, and arranged transversely to the axis of the rolls beneath the press-box, for a purpose hereinafter set forth. No particular limitation is herein placed upon the construction of said tables, since various other arrangements of flooring or guideways, either with or without rolls, could be employed. It may, however, be observed that the construction herein shown involves a simple and desirable arrangement well adapted to support and facilitate the forward feed or advancement of the molds.

The molds G may be of any appropriate construction, commonly being formed by dividing the space within each of a set of equal sized rectangular frames into any suitable number of compartments, sized and shaped with reference to the bricks that are to be molded therein.

The feed device or pusher for advancing the molds may consist of a follower, push-bar, or roller $h$, arranged and suitably actuated to traverse the receiving-platform. The pusher is herein advanced by the action of an oscillatory lever H, hereinafter termed the "push-lever, which is connected with the follower or push-bar through the medium of suitable power-transmitting connections, in which way a swing or impulse on the part of the lever in one direction can serve to advance the push-bar, while an impulse on the part of the lever in an opposite direction may serve to retract or permit the retraction of said bar. As a simple way of connecting the push-lever with the push-bar, a rock-shaft $h'$, herein journaled at the forward lower portion of the main frame, is provided with a set of arms whereof the arm $h^2$ is connected with the lower end of the lever through the medium of a link or connecting-rod $h^3$, while the two remaining arms $h^4$ are connected with the push-bar or roller through the medium of links or connecting-rods $h^5$. The push-lever is arranged in an upright or proximately upright position alongside the pug-mill, and is fulcrumed at a point between its ends, so that while the lower end of the lever can be conveniently connected with the rock-shaft by a single rod or link its upper end can be brought within the range of action of a revolving cam or wiper $h^6$, operated from some suitable source of power, and arranged and so outlined that a portion of its revolution shall cause an impulse on the part of the lever in a direction to advance the push-bar, while on the other hand the remaining portion of its revolution will simply permit the lever to be restored to its first position. This cam acts against an anti-friction roller $h^7$ on the upper end of the lever, and is bent or curved and hung in such relation to the direction of movement of the point of said upper end of the lever that from the commencement to the ending of such portion of a revolution on the part of the cam as may cause a swing on the part of the lever the action of the cam against the anti-friction roller will be in a direction substantially coincident with the line of motion of the upper end of the lever. In this way while the revolving arm or cam is acting against the roller or other like upper end portion of the lever so as to cause the lever to swing in a direction to effect the advancement of the molds the line of force of the impelling-power will be proximately coincident with the direction of motion of such upper end portion of the lever as may be engaged by the cam, and hence a steady uniform action will be attained.

A further advantage derived from the foregoing arrangement of cam and lever is the provision of exceedingly simple and efficient means whereby the resistance of the molds that are to be moved along the table or platform can be overcome by the application of moderate driving-power. As a preferred means for returning the push-bar or roller to its back position and for controlling the push-lever so as to maintain it subject to the action of the revolving cam, I pivot upon the main frame of the machine a bent or substantially bell-crank lever $h^8$, carrying at one end an adjustable weight $h^9$, and having its opposite downwardly-bent end portion arranged to act against a stud or roll $h^{10}$ or other like bearing, either upon or connected with the lower arm of the push-lever. Thus, for example, the roller $h^{10}$ can be journaled within a forked end of the connecting-rod $h^8$, in which case the end portion of the unweighted arm of the lever $h^8$ can be extended downwardly between the prongs of the fork, as in Fig. 1. The swing of the push-lever in a direction to advance the push-bar will swing the weighted lever in a direction to raise the weights, in which way the revolving cam $h^6$ and the weight $h^9$ alternately operate the push-lever, the revolving cam serving during a portion of its revolution to swing the lever in a direction to cause both the advancement of the molds and a rise on the part of the weight $h^9$, which latter serves during the remaining portion of said revolution on the part of the cam to cause a reverse swing on the part of the lever.

The push-lever, like the plunger, is conveniently actuated from the pug-shaft, to which end the cam which moves it is fixed to one end of a horizontally-arranged transmission-shaft $h^{11}$, which at the other end is provided with the bevel-gear $h^{12}$, meshing with the smaller bevel-gear upon the pug-shaft, which latter thus serves as a driving-shaft for operating both the plunger and the devices for advancing the molds.

I have found by experiment that in running an automatic brick-machine involving a mode of operation such as herein set forth but one set of molds should be filled to each revolution on the part of the pug-shaft, which, as hereinbefore observed, is understood to carry suitable pugging devices. This I find to be due to the fact that the knives or other devices upon the pug-shaft cannot during a single revolution of the shaft properly temper the clay for more than one set of molds. In view, therefore, of the foregoing I propose to so operate the pusher and the plunger that for each revolution of the pug-shaft but one mold-frame or set of molds will be brought under the press-box and the tempered clay pressed into such set of molds by a downstroke of the plunger. The arrangement of gears described affords a simple, compact, and economical means to this end. In such arrangement, in order to properly time each effective part with reference to the required advancement of the pusher and downstroke of the plunger, the bevel-gear upon the transmission-shaft or crank-shaft by which the plunger is operated will be equal with the gear by which it is driven, as will conversely the bevel-gear on the cam-shaft by which the push-lever is actuated be equal with its driver. It will be understood, therefore, that the larger gears can be employed for driving the cam-shaft and that in such case the smaller gears can be employed for driving the crank or plunger shaft.

As an automatic safety device for avoiding injury to either the molds or the devices by which they are advanced in case the free action of such devices should be opposed in any way—as, for example, by the presence of any obstruction to the free passage of the molds, either under or from under the press-box—I provide for the push-lever a yielding fulcrum, which is arranged and controlled so that while it will serve as a stationary fulcrum during all ordinary or proper work it will yield or shift when encountering undue opposition to the advancement of the molds. To the attainment of the foregoing end, the fulcrum or pivot pin I for the lever could be retained in its normal position by the action of a spring arranged to oppose an elastically-yielding resistance to any tendency on the part of the fulcrum-pin to move from such position. I prefer, however, to employ a weight $i$ in place of a spring, since in several respects the employment of a weight involves certain advantages over a spring and is more desirable as a means for controlling the position of the fulcrum-pin. The weight $i$ is carried by an arm $i^2$ on a vibratory crank or safety lever $i^3$, that is hung upon the mill-frame or other suitable support, and said weighted crank or lever is connected with the fulcrum-pin of the push-lever through the medium of a link or connecting-rod $i^4$. The link $i^4$ is provided with a forked end arranged to receive the push-lever and to work between the slotted sides of a bracket K, presently referred to, and serving as fulcrum-support for said lever and as a guide to the forked end of the link, which latter is pivotally connected with the push-lever through the medium of the fulcrum-pin thereof, the opposite end of the link being pivotally connected with the weighted crank or safety-lever in any suitable way—as, for example, said crank or lever $i^3$ can be provided with a forked portion adapted to receive the link and to provide bearings for a pin $i^5$, employed to connect the link with itself. The pin $i^5$ can be attached to the safety-lever in any desired way; but as a preferred arrangement the pin has its bearings in bushings $i^6$, that are held within recesses on the lever by set-screws $i^7$, in which way the bushing can be adjusted so as to compensate for wear. This safety-lever is provided with a ratchet $i^8$, which is rigid with the lever and conveniently formed along a lower extension or plate depending therefrom, substantially as herein illustrated, it being observed that while the safety-lever for the purposes for which it is herein employed is not necessarily shaped as hereinbefore described reference is made to such details of form as explanatory of the irregular construction illustrated. The ratchet portion $i^8$ of the lever is engaged by a pawl $i^9$, having a weighted arm $i^{10}$, which serves to throw the pawl upwardly and maintain it in engagement with the ratchet.

When the shifting pivot or fulcrum for the push-lever is in its normal position at one end of the guideway, said fulcrum will be maintained in such position by a jointed attachment which somewhat approaches a toggle-joint, since at such juncture the three pivots comprising the fulcrum-pin I, the pivot $i^5$, by which the link $i^4$ is attached to the safety-lever, and the pivot $i^{11}$, upon which said lever is hung, will all be nearly in line, as in Fig. 4. By this arrangement the fulcrum-pin of the push-lever can under all ordinary circumstances be maintained by a comparatively light weight in one and the same position, but will yield and move from such position in opposition to the resistance of the weight when, for example, the free advancement of the molds is opposed by some obstruction. The power of the safety device to resist a tendency on the part of the push-lever to shift its fulcrum-pin can be regulated by the pawl $i^9$, since by adjusting the point of engagement between said pawl and the ratchet the weighted lever can be set so as to place the pivot $i^5$ more or less out of line with the pivot $i^{11}$ and shifting fulcrum.

To permit and direct the movement of the shifting fulcrum-pin of the push-lever, it has its bearings in the above-mentioned bracket K, that is secured to the mill-frame or other suitable support and adapted to provide guideways for supporting the fulcrum-pin, but permitting it, under conditions hereinbefore mentioned, to move in opposition to the resistance of the safety-lever. The bracket K is therefore conveniently divided along a portion of its length and provided with slots $k'$ along its opposite side portions $k^2$, and the push-lever is extended between the slotted sides of the bracket, so that its fulcrum-pin can engage in the slots, which serve both as fulcral supports and guideways for the fulcrum-pin, while the sides themselves serve as guards to embrace the forked end of the link $i^4$ and steady the push-lever.

In operating brick-machines wherein the clay is pressed into molds, considerable difficulty has been experienced in emptying the molds when the clay is of a character to cause it to stick to the walls of the same. In some instances it has been proposed to provide rigid bumpers, against which the ends of the mold-frame can be brought in such a way as to cause the mold-frame to strike a jarring blow. In such cases, however, it has been necessary to bring the mold-frames squarely against the bumpers in order to avoid racking. As a means for avoiding such defect and for obviating the necessity of undesirable devices particularly designed to accurately guide the mold-frames, I provide upon the mold-table at the front of the machine one or more, but preferably a couple, of self-adjusting bumpers L, which under all circumstances will adapt themselves to such ends of the mold-frames as may be brought against them. As a simple construction of self-adjusting bumper, a horizontally-arranged oscillatory bar $l$ is at its middle pivotally mounted upon a suitable post or support $l'$ and at each end provided with a cushion or bumper-head $l^2$. The two cushions or heads of this double-headed bumper are set apart relatively to the width of a mold-frame, so that when the mold-frame is moved endwise toward the bumper the two ends of the side bars of the frame may respectively engage one and the other of the two bumper-heads. In this way, whether the mold-frame be brought squarely up to the bumper or be brought more or less obliquely thereto, the final impact which produces the desired concussion will not be made until the bumper is parallel with the end of the frame and in position to squarely meet the blow. The extent of the oscillatory movement on the part of the bumper can be limited by any suitable arrangement of stop device—as, for example, by stops $l^3$, secured upon the mold-table, or by stops both upon the bumper and the table, as may be desired. It will be observed that in this connection the rolls $f^3$, arranged transversely to the line in which the mold-frame is to be moved toward either bumper, permit the mold-frame to be readily and quickly moved, so as to bring it with a suitable degree of force against the bumper.

To facilitate the operation of properly placing the empty molds upon the receiving-platform, I provide at one side of such platform a short laterally-arranged table or guideway M, which can be either attached to the receiving-platform or to one of the connecting-rods, by which the push-bar is operated from the push-lever and intermediate rock-shaft. Preferably, however, the lateral table or guideway is carried by one of said connecting-rods, as herein shown, so that in passing a mold along such guideway to bring it into place upon the receiving-platform the location of the guideway relatively to the push-bar will at all times be such as to insure the placement of the mold just in advance of and parallel with the push-bar.

In some instances it is desirable to draw a mold forward by manual operation — as, for example, when it is found convenient to operate the push-bar by hand for the purpose of positioning a mold under the press-box. This manual operation can be effected by the hand-lever N, which is loosely hung upon the above-mentioned intermediate rock-shaft $h'$ or other suitable pivotal support and provided with suitable laterally-projecting arms $n$, (see Fig. 2,) which when the lever is swinging forward engage one or more arms upon the rock-shaft—for example, the arm $h^2$ and one of the arms $h^4$. When not in use, the lever N may rest against the mill-frame, as in Fig. 1, in which position its lower projections or arms $n$ will be out of the way of the rock-shaft arms.

In operation the empty molds are placed one after another upon the platform below the pug-mill, and the push-lever is given a vibratory stroke or swing to an extent to cause the push-bar at each forward impulse to move substantially the width of a mold-frame or such a distance as to shove the mold-frame immediately in advance the space of its width, in which way the consequent forward advancement of the entire set of molds will serve while bringing an empty mold beneath the press-box to push a filled mold from under the latter. As each frame comes beneath the press-box the plunger descends and packs the contents of the box into the molds; then the plunger rises, the pusher acts anew to eject the filled mold-frame and replace it by an empty one, attendants seize the filled frame, and, after jarring it against the bumpers, remove it from the machine.

It is obviously within the scope of my invention that in connection with the push-lever any suitable device for pushing or advancing the molds may be employed, and that the distinctive features of the cam for operating said lever and the automatic safety device for preventing breakage of parts, as hereinbefore set forth, may subserve their allotted purposes in connection with various arrangements of devices for advancing the molds. It is also evident that for certain purposes of said invention various changes in details of construction can be made without departing from the spirit of my invention embodied in certain combinations herein claimed, as will be understood by those acquainted with the art.

What I claim as my invention is—

1. The combination, with the push-lever, of the shifting fulcrum therefor arranged about midway of its length, the cam acting upon its upper end, the weighted elbow-lever or wiper provided with a roller traveling along and acting upon the lower end of the push-bar in opposition to the cam, an independent connection between said lower end and the push-bar, and the weighted lever acting upon the shifting fulcrum to hold it in normal position.

2. The combination, substantially as hereinbefore set forth, with a lever for causing the advancement of a suitable mold-pusher, of the weighted lever provided with a ratchet and connected with a shifting fulcrum for said lever, and a pawl arranged to engage the ratchet of the weighted lever, for the purpose described.

3. The combination, substantially as hereinbefore set forth, with the push-lever, of the bracket having guideways, the fulcrum-pin of the lever having a shifting pivotal connection with said bracket along said guideways, and a weight connected with the lever and hung to oppose the shift of the fulcrum-pin from its normal position.

4. The combination, substantially as hereinbefore set forth, with the push-lever, of a shifting fulcrum for said lever, a weighted lever provided with a ratchet and connected with said fulcrum by a link, and a pawl arranged to engage the ratchet of the weighted lever, for the purpose described.

5. The combination, with one or more doors at the lower portion of the front side of the press-box, for the purpose set forth, of guards arranged at the ends of the door or doors to prevent the escape of clay at such points when the door may be opened.

6. The combination, with a door such as set forth, arranged at the front side of the press-box, of a lever hung upon the press-box and connected by a pendent rod or link with the door, a stop upon said lever, and a spring or weight applied to the lever, for the purpose described.

7. The combination, substantially as hereinbefore set forth, with a door arranged at the front of the press-box, of a spring or weight controlled lever hung upon the press-box at a point over the door, a rod or link connecting said lever with the door, a stop upon said lever, and means, such as set forth, for adjusting resistance of said device to the outward swing of the door, substantially as described.

8. The combination, substantially as hereinbefore set forth, with the press-box and plunger pivotally attached to the lower portion of the press-box, of a spring arranged between the plunger-stem and a side portion of the press-box, for the purpose described.

9. The combination, with a suitable mold support or table, of a self-adjusting bumper, for the purpose described.

10. The combination, with a suitable mold support or table, of an oscillatory bumper arranged to receive the impact of the end of a mold-frame, for the purpose described.

11. The combination, with a suitable mold support or table, of a double-headed oscillatory bumper L, for the purpose described.

12. The combination, with a mold-supporting table constructed with a series of flooring-rolls, of a self-adjusting bumper arranged at either or both ends of the mold-table, substantially as set forth.

13. The combination, substantially as hereinbefore set forth, with the pusher for advancing the molds, and an armed rock-shaft connected with the pusher, of the hand-lever arranged to swing independently of the rock-shaft, but adapted to be thrown into connection therewith, whereby the mold-pusher can be advanced by operating the hand-lever when so desired.

14. The combination, substantially as hereinbefore set forth, with a mold-receiving platform and a pusher for advancing the molds, of a guideway or table carried with the pusher and adapted for the direction of molds into the mold-receiving platform, for the purpose described.

15. The combination, with the mold-box and feed-table, of the rolls $f^2$, constituting the flooring beneath said box, the transverse rollers $f^3$ beyond said box, constituting the mold-table, and bumpers at one or both ends of said mold-table.

WILLIAM H. HALL.

Witnesses:
ROBERT LYSLE,
R. D. SNEATH.